(12) United States Patent
Brueckheimer et al.

(10) Patent No.: US 6,714,543 B1
(45) Date of Patent: Mar. 30, 2004

(54) ATM COMMUNICATIONS SYSTEM AND METHOD

(75) Inventors: Simon Daniel Brueckheimer, London (GB); David John Stacey, Herts (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/284,784

(22) PCT Filed: Oct. 17, 1997

(86) PCT No.: PCT/GB97/02882
§ 371 (c)(1),
(2), (4) Date: Oct. 25, 1999

(87) PCT Pub. No.: WO98/18288
PCT Pub. Date: Apr. 30, 1998

(30) Foreign Application Priority Data

Oct. 18, 1996 (GB) ................................................ 9621775

(51) Int. Cl.[7] ............................ H04L 12/28; H04L 12/56
(52) U.S. Cl. ................................. 370/395.1; 370/395.6; 370/538; 370/535
(58) Field of Search .......................... 370/395.1, 395.6, 370/395.61, 465, 469, 473, 474, 535, 537, 538, 389

(56) References Cited

U.S. PATENT DOCUMENTS

| | | | | |
|---|---|---|---|---|
| 4,956,839 A | * | 9/1990 | Torii et al. ................... | 370/232 |
| 4,984,264 A | * | 1/1991 | Katsube ....................... | 370/230 |
| 5,062,106 A | * | 10/1991 | Yamazaki et al. ........ | 340/825.5 |
| 5,067,123 A | * | 11/1991 | Hyodo et al. ............... | 370/396 |
| 5,084,867 A | * | 1/1992 | Tachibana et al. .......... | 370/398 |
| 5,119,369 A | * | 6/1992 | Tanabe et al. .............. | 370/392 |
| 5,166,926 A | * | 11/1992 | Cisneros et al. ............ | 370/392 |
| 5,214,642 A | * | 5/1993 | Kunimoto et al. .......... | 368/239 |
| 5,301,184 A | * | 4/1994 | Uriu et al. .................. | 340/2.23 |
| 5,675,574 A | * | 10/1997 | Norizuki et al. ............ | 370/230 |
| 6,018,525 A | * | 1/2000 | Sucharczuk ................. | 370/394 |

* cited by examiner

Primary Examiner—Ajit Patel
(74) Attorney, Agent, or Firm—Barnes & Thornburg

(57) ABSTRACT

The invention relates to a method and apparatus for multiplexing traffic from a plurality of fixed bit rate sources over an ATM network. The traffic from the fixed bit rate users is multiplexed to form a TDM trunk group which is assembled into AAL2 minicells prior to being converted to ATM cells for transmission on the ATM network. By combining the fixed rate traffic sources into a TDM trunk group and then mapping the trunk group into AAL2 minicells, it is possible to improve efficiency of fixed bit rate traffic transmission using the ATM protocol.

10 Claims, 7 Drawing Sheets

ATM COMMUNICATIONS SYSTEM AND METHOD

This invention relates to digital telecommunications systems and in particular to an arrangement and method for transmitting a synchronous transfer mode (ATM) traffic.

BACKGROUND OF THE INVENTION

A recent development in telecommunications technology has been the introduction of the a synchronous transfer mode (ATM) transmission technique. The a synchronous transfer mode (ATM) technology is a flexible form of transmission which allows various types of service traffic, e.g. voice, video or data, to be multiplexed together on to a common means of transmission, the traffic being carried in cells each having a header indicating its destination. The service traffic is adapted typically into 53 byte cells comprising 5 byte headers and 48 byte payloads such that the original traffic can be reconstituted at the far end of the ATM network. This form of adaptation is performed in the ATM adaptation layer (AAL). The technique allows large volumes of traffic to be handled reliably and efficiently.

There is now a need to make provision for low bit rate multiple users who wish to share an ATM connection. This has introduced the problem of the assembly delay that is encountered in assembling the user traffic for despatch.

SUMMARY OF THE INVENTION

An object of the invention is to minimize or to overcome this disadvantage.

According to the invention there is provided a method of transmitting traffic from a plurality of low bit rate users over an ATM connection via a dynamic structured data transfer (DSDT) process, the method including multiplexing the user traffic together on a trunk group or frame by frame basis.

According to another aspect of the invention there is provided a method of transmitting traffic from a plurality of low bit rate users over an ATM connection via a dynamic structured data transfer (DSDT) process, the method including changing the trunk group structure size dynamically in order to accommodate for fewer or greater low bit-rate users on the connection.

According to a further aspect of the invention there is provided apparatus for transmitting traffic from a plurality of low bit rate users over an ATM connection via a dynamic structured data transfer (DSDT) process, the apparatus including means for changing the trunk group structure size dynamically in order to accommodate for fewer or greater low bit-rate users on the connection.

Low bit-rate synchronous services can be defined as any low bit-rate (64 kb/s or lower) service that generates user information on a fixed periodic basis. For example, for 64 kb/s, 32 kb/s and 16 kb/s an octet of information is generated every 125 ms, 250 ms, and 500 ms respectively. By multiplexing on a trunk group basis using DSDT, a considerable increase in bandwidth utilisation for a given bounded cell assembly delay can be achieved.

SSCS/DSDT enables multiple low bit rate users to be multiplexed together on a trunk group basis, i.e. one minicell per frame rather than on a user by user basis, to achieve a high bandwidth efficiency for a given bounded cell assembly delay. Irrespective of trunk group size, the SSCS/DSDT mechanism can be tuned to generate SDUs of length approximately equal to the ATM payload size—this yields the optimum balance between high bandwidth efficiency and eliminating potential error extension. The size of the trunk group is deterministic and thus at all times the receive station will have implicit knowledge of the length of the mini-cells that it receives.

However, it is possible to change the size of the trunk group dynamically during the lifetime of the connection to accommodate changes in the community of low bit-rate users. The structure size change is performed in a controlled manner through ANP (access node processor) negotiation and so again, the receive station has full knowledge of the new structure before the in-band change is made. DSDT can be implemented into all three of the proposed AAL-CU alternatives at present under study, and it is possible to multiplex DSDT services into the same ATM connection containing other types of services.

BRIEF DESCRIPTION OF THE DRAWINGS

An embodiment of the invention will now be described with reference to the accompanying drawings in which.

Figure 1:
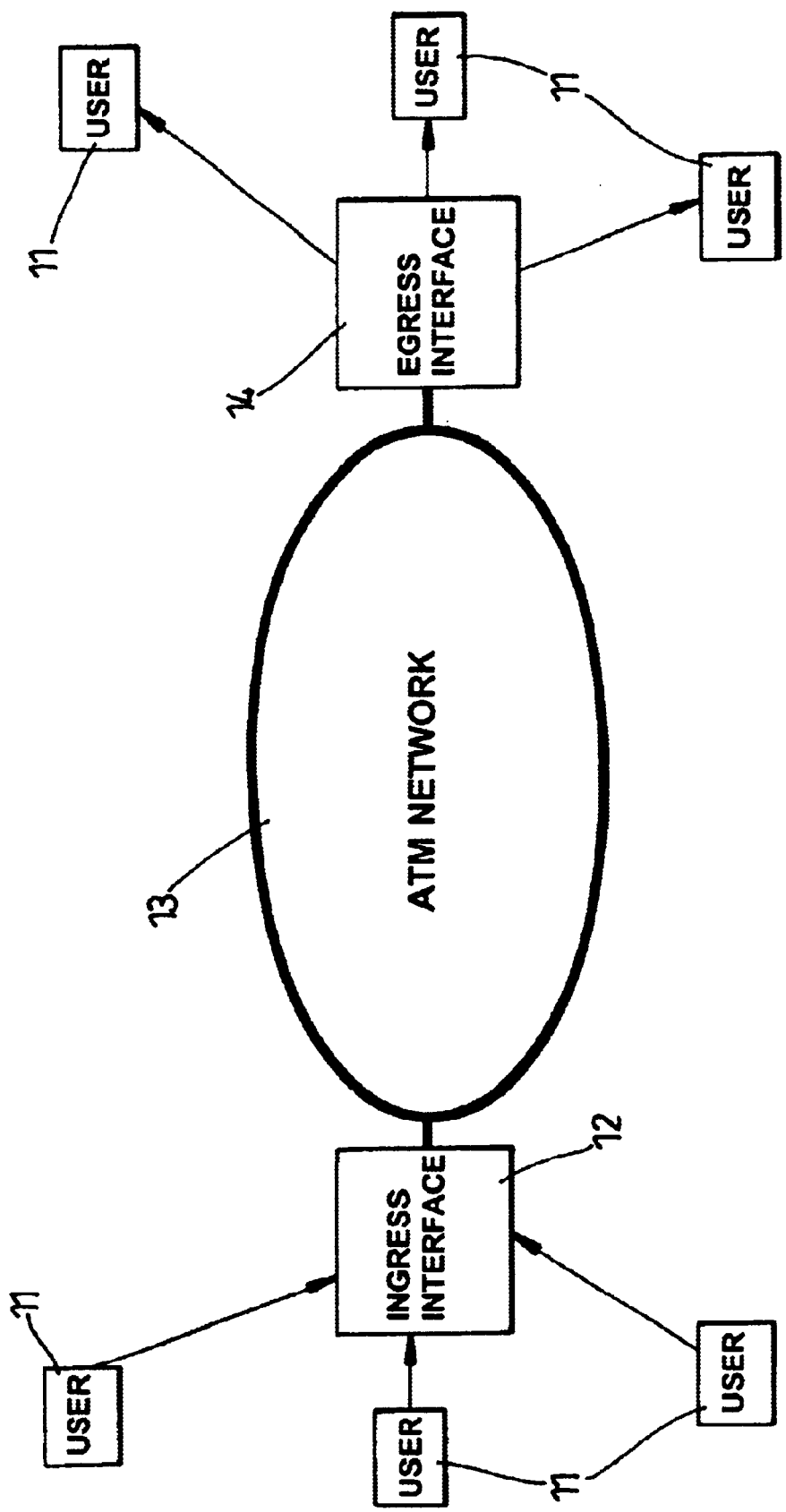
FIG. 1 is a highly schematic diagram illustrating an ATM network providing composite user access.

Referring first to FIG. 1, traffic from a number of users 11 is routed to an interface 12 where multiplexing of the user traffic into ATM cells is performed. The assembled ATM cells are provided with appropriate header information and are transmitted across the ATM network 13 to an egress interface 14 where cell disassembly and demultiplexing is performed to recover the user traffic.

Figure 2:
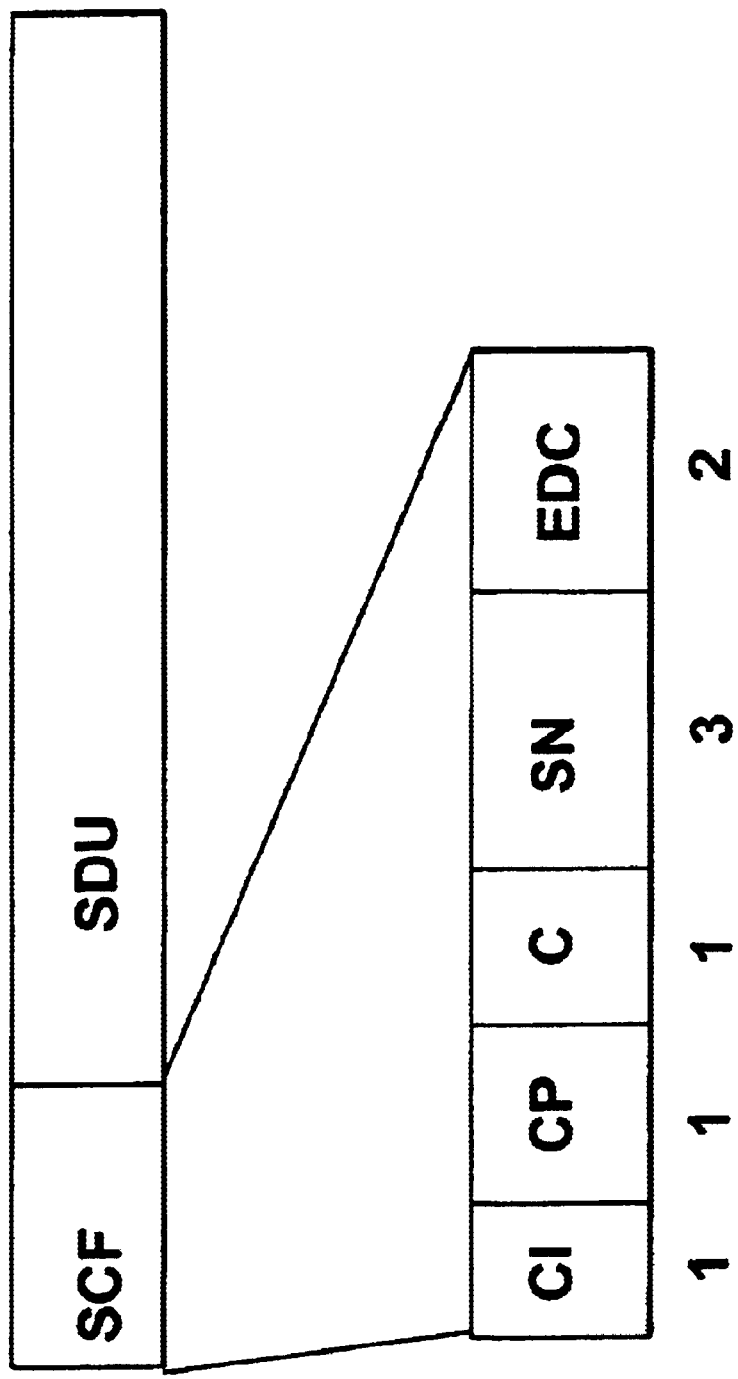
FIG. 2 illustrates an ATM SSCS/DSDT format for providing trunk group multiplexing in the network of FIG. 1

The format of the AAL-CU DSDT SDU employed in the network of FIG. 1 is shown in FIG. 2. The mechanism is controlled by the operation of a simple SSCS Control Field (SCF) that contains 5 elements occupying at most one byte of payload. Dependent on the particular implementation of the AAL-CU CPS, the DSDT SCF can be implemented in fewer bits whilst still achieving satisfactory operation. The five elements of the SSCS/DSDT SCF are: a sequence number that enables the detection of lost or mis-inserted trunk group frames; a change indication flag and a change pulse flag, through which an in-band change in the trunk group structure size is indicated; a continuation marker that enables large trunk groups to be segmented into multiple SDUs in a similar manner to long data packets; and an error detection field that provides the minimal protection required over the SCF.

In the arrangement of FIGS. 1 and 2, a cell sequence number is used as the primary mechanism to guard against the loss or mis-insertion of a cell or structure. Detection of lost/mis-inserted structures can be very important for synchronous services to ensure that the end-to-end phase relationship Is maintained. Generally loss of phase will lead to error extension, particularly for modem traffic where it can lead to a loss of synchronisation which entails a re-synchronisation process of significant duration. A mini-cell sequence number is therefore provided in SSCS/DSDT. A 3 bit modulo 8 sequence number is shown in the proposed SCF format in FIG. 2. We have found that this provides a very high degree of protection against ATM cell loss.

Satisfactory performance can be achieved with a shorter sequence number (2 bits) particularly if used in conjunction with an ATM cell sequence number. The final length of the sequence number is implementation specific—a shorter sequence number can be used if one wishes to reduce the SCF overhead, for example to 'shoe-horn' it into unused bits that might reside within the PCI.

A particular feature of DSDT is the ability to change the trunk group structure size dynamically in order to accommodate for fewer or greater low bit-rate users on the connection. The change is controlled through negotiation (via the ANP) such that at all stages the receive station has full knowledge of the current and new structure sizes Once the parameters of the new structure size are agreed, the transmit station can perform the change. It must provide an in-band change indication mechanism to accompany the change so that the receiver can detect the change boundary—in this way the end-to-end phase relationship between transmit and receive stations is maintained at all times. The in-band change mechanism should be robust in the possible presence of bit error or cell loss conditions and thus has the following minimum requirements:

ability to determine phase/start of structure size change, ability to always determine current structure size even in the event of, burst error conditions, i.e it is always possible to attain full re synchronisation even when a change is pending;

no error extension in the event that the change occurs in the presence of a single cell loss/error condition;

The second requirement dictates that the basic mechanism must provide a permanent indication that the change has occurred. Any structure change relying solely on a transitory indicator could be missed completely under cell loss conditions—making the resultant re-synchronisation process extremely complex and potentially ambiguous.

The third requirement is more demanding. In the event of a cell loss a permanent change indicator will generally indicate that a change is about to occur or has already occurred. It may not be sufficient to predict the exact (phase) boundary of the change. If this is mis-interpolated, in the worst case, a permanent phase change will occur.

To meet these requirements the in-band structure size change indication is implemented via two single bit fields, which provide both a permanent and a transitory indication of the change.

Figure 3A:
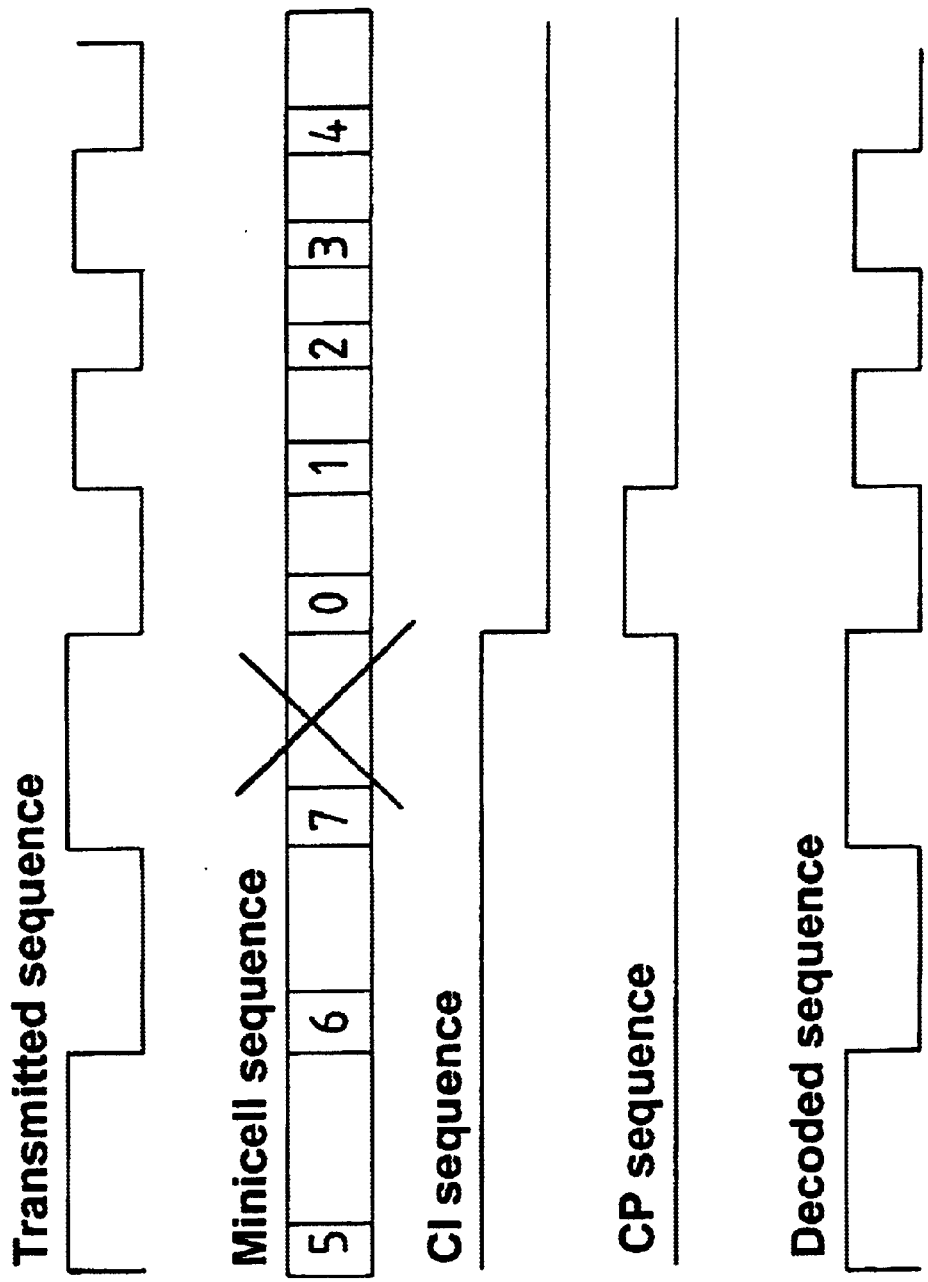
FIGS. 3a, 3b and 3c illustrate the robustness of the trunk group multiplexing process to cell loss.
Figure 3B:
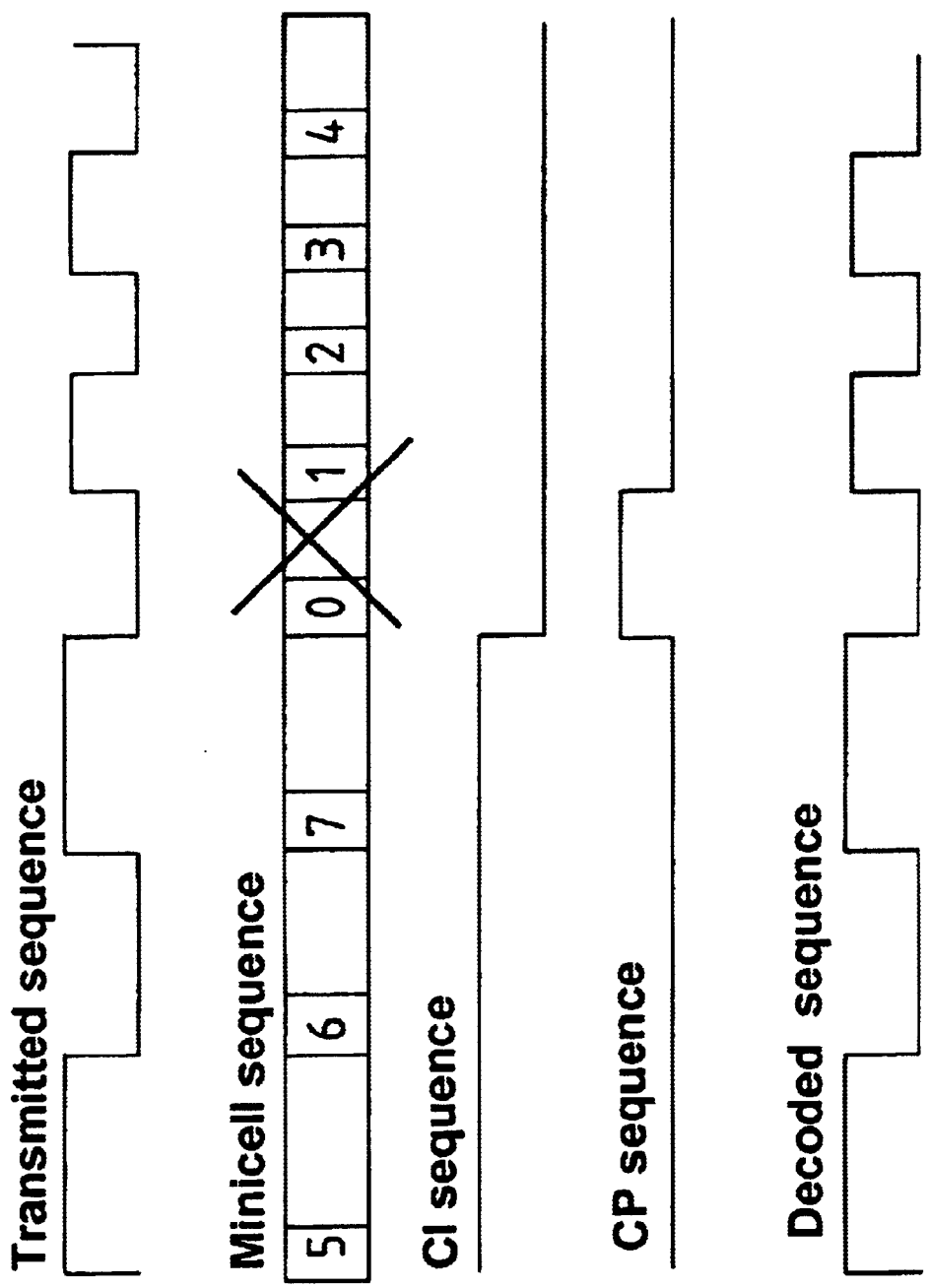
Figure 3C:
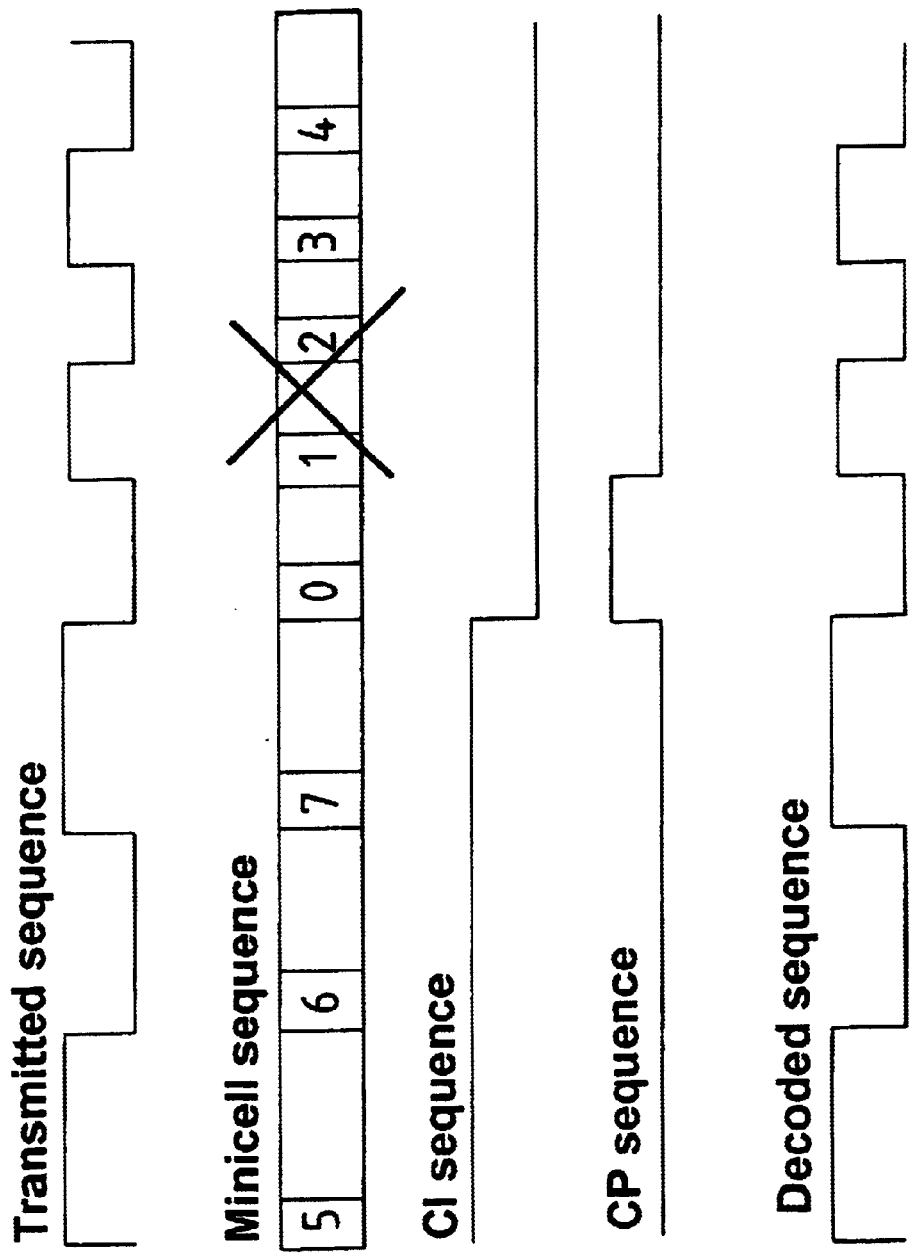

The single bit CI element provides the permanent change indication. Its sign is inverted at the mini-cell boundary immediately prior to the structure chang, i.e. the first mini-cell payload containing an inverted CI contains the first frame at the new structure size. The CP element provides further correlation of the rate change—it is a single bit field that is 'pulsed' once to indicate the position of the change. The combination of the CI and CP fields provides a secure change indication method, even In the event of cell loss The robustness of the technique to the effects of cell loss is illustrated in FIGS. 3a to 3c which illustrate recovery where a cell has been lost before, during or after implementation of a change. In FIG. 3a, cell 7 has been lost, but, because cell 0 has both inverted CI and CP set, the receiver can infer that minicell 7 did not contain a structure size change but minicell 0 does. In FIG. 3b, cell 0 is lost. Cell 1 has inverted CI but not a set CP. Therefore the change must have occurred in the preceding minicell 0. In FIG. 3c, a structure size change has been implemented through minicell 0. Minicell 1 has been lost, but minicell 2 has the same CI as minicell 0 (and no CP). Hence the receiver can infer that no further changes have occurred.

An objective of the SSCS/DSDT mechanism is to achieve optimum bandwidth utilisation whilst minimising error extension effects and enabling DSDT users to be freely multiplexed with SCA users. This is achieved by tuning the mechanism such that it produces SDUs of near optimum length irrespective of trunk group size. The optimum mini-cell length is equal to the free payload size of the ATM cell thus minimising PCI overhead whilst still guaranteeing one PCI per cell to avoid error extension effects. This is achieved in two ways. For large trunk groups, i.e. greater than the payload size, the SSCS/DSDT can segment the structure across multiple SDUs. For small trunk groups it is possible to concatenate several frames of data together into one SDU. The following sub-sections describe in detail how this is performed.

In AAL-CU generally, it very large mini-cells are assembled then several successive ATM payloads without a single PCI could be generated. Under these conditions a single bit error may lead to a prolonged error extension thus degrading the overall error performance of the communications link. To prevent this the maximum size of a mini-cell should be restricted and there is general agreement that the maximum should be fixed so that a mini-cell can fit into a single ATM cell. The SSCS/DSDT must comply with this maximum. However there should be no restraint placed on the maximum size of a trunk group itself. Therefore, the SSCS/DSDT is provided with a continuation mechanism to enable large trunk groups to be efficiently segmented into multiple AAL-CU mini-cells, as per a long data packet.

The continuation (C) field is a single bit marker that is set to indicate the continuation of the trunk group into the following mini-cell. Continuation mini-cells will always be a single, constant length (set to comply with the maximum mini-cell size) and therefore the receive station has implicit knowledge of the mini-cell length once the continuation bit has been detected.

Figure 4:
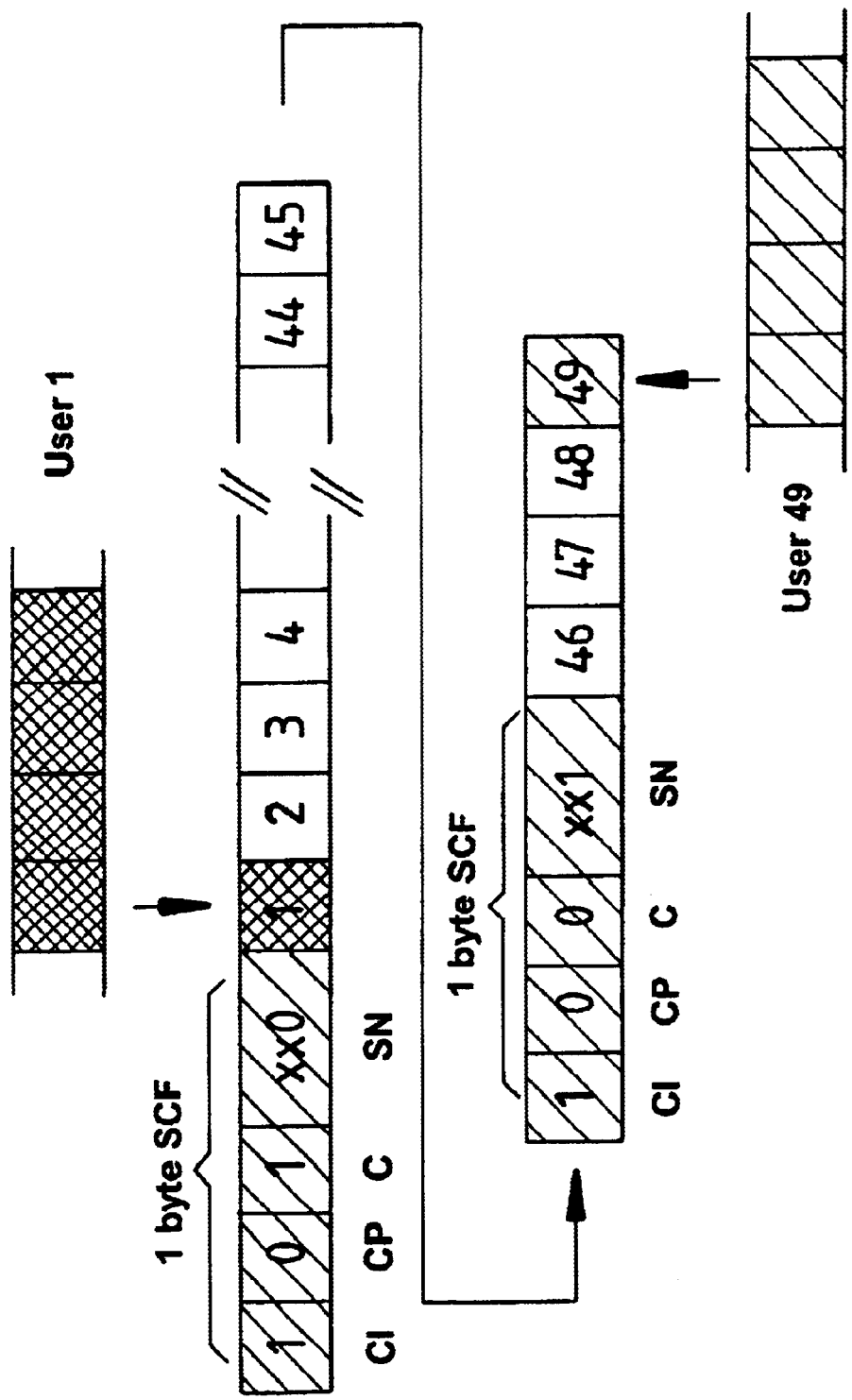
FIG. 4 illustrates the multiplexing of long data structures in the network of FIG. 1.

The C bit is reset in the last mini-cell which contains the remainder of the trunk group. The size of this mini-cell will again be fixed, dependent on total trunk group size, and again the receiver has implicit knowledge of its size irrespective of whether it loses any of the proceeding continuation mini-cells. FIG. 4 shows by way of example of how a long trunk group structure containing 49 low bit-rate users, is segmented into SSCS/DSDT SDUs.

The mini-cell assembly delay is obviously increased when successive trunk group frames are multiplexed together. The maximum mini-cell assembly delay may therefore be controlled by specifying a minimum trunk group size. For example a minimum trunk group size of 6 users implies that it will take at most 8 successive frames to generate a mini-cell data unit equal in length to the ATM payload. At a 64 kb/s user bit-rate this implies a maximum mini-cell assembly delay of approximately 1ms which is satisfactory for most applications. The maximum mini-cell assembly delay can be increased or decreased by defining the minimum trunk group size accordingly. Further it should be noted that it the AAL-CU connection is dedicated to the SSCS/DSDT function then the total ATM cell assembly delay is identical, irrespective of whether the data is assembled in the SSCS layer or CPS multiplexing and demultiplexing sub-layer. SSCS/DSDT will therefore support the concatenation of multiple small trunk group structures in the SSCS layer.

Figure 5:
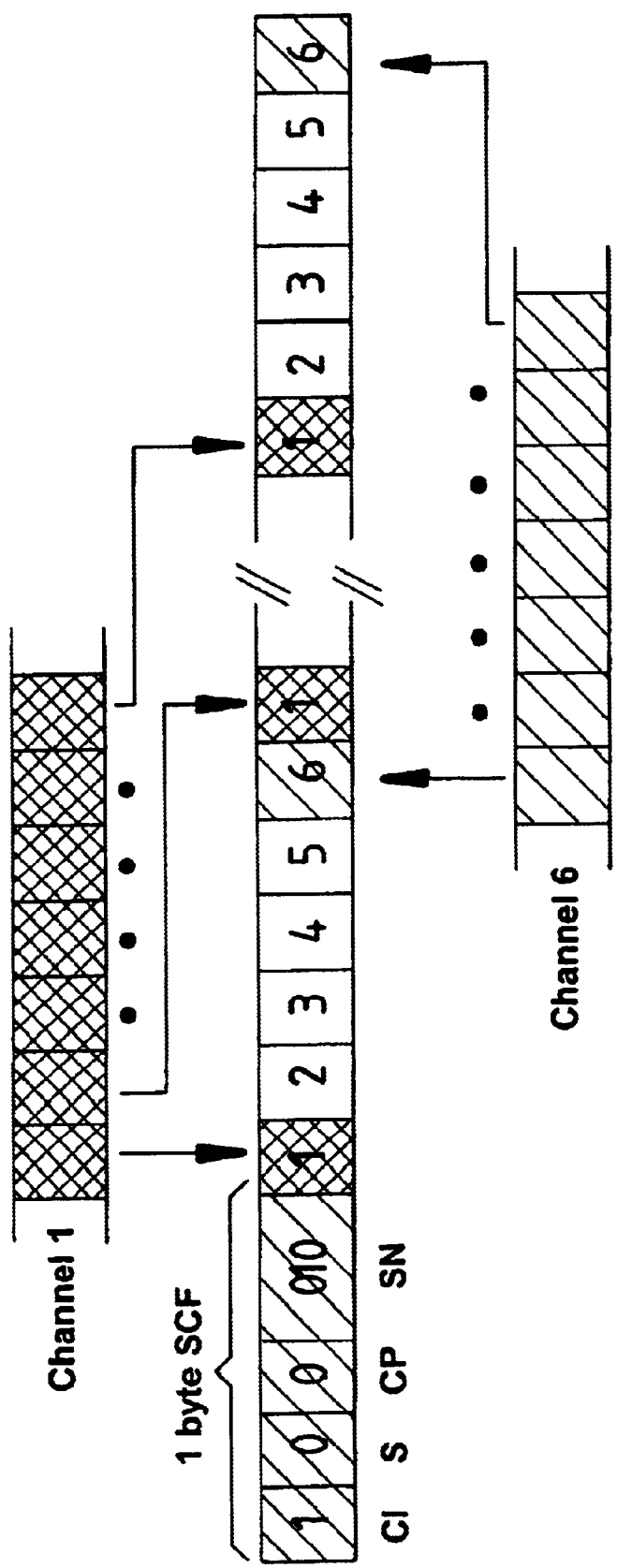
FIG. 5 illustrates the concatenation of small trunk groups in the network of FIG. 1.

FIG. 5 illustrates how successive frames of a small trunk group can be concatenated together to form a single SSCS/DSDT SDU. The number of frames that can be bound into a single mini-cell SDU is dependent on the current trunk group structure size. It may be calculated as the integer division between the maximum data unit size (for example 45 octets are available in AAL-CU Alternative 1) and the trunk group size. The PCI overhead is thus minimised whilst not exceeding the maximum mini-cell length limit. For example with a 6 channel trunk group this implies that 7 successive frames of data can be concatenated together. The bandwidth efficiency of the connection therefore varies with the structure size (see the following section on implementation for calculations of bandwidth utilisation) however in all cases the utilisation is significantly higher than that attained for a similar AAL-CU SCA connection. Further, although the size of the mini-cell varies with the structure size its size is completely deterministic and again the receiver always has implicit knowledge its length.

Implementation of the dynamic structured data transfer can be readily achieved either by replacing the conventional LI (length indicator) field with a SSCS field or by adding a single octet of additional control information to the start of each minicell payload.

What is claimed is:

1. A method of communication user traffic of a plurality of low bit rate users over an asynchronous transfer mode (ATM) communications network, said method comprising the steps of;

multiplexing traffic from each of said plurality of low bit rate users to from a trunk group;

mapping said trunk group into ATM minicells; and assembling said minicells into ATM cells for transmission over said ATM network, wherein the trunk group size is varied dynamically to accommodate a change in the number of users; and an in-band chance in a trunk group size is indicated though a combination in a minicell of a change indication (CI) flag which provides a permanent change within the minicells change pulse (CP) flag which provides a position of the change within the minicells.

2. A method as claimed in claim 1, wherein large trunk group structures having a length greater than that of a minicell are segmented and assembled into minicells of equal length.

3. A method as claimed in claim 2, wherein service specific convergence sub-layer (SSCS) control field (SCF) include a continuation maker (C) to enable large trunk groups to be segmented an assembled into ATM minicells.

4. A method as claimed in claim 3, wherein said continuation marker (C) comprises a single bit field in the SCF.

5. A method as claimed in claim 1, wherein multiple small TDM trunk group structures are concatenated into a single minicell payload.

6. A method as claimed in claim 1, wherein trunk groups formed by multiplexing user traffic from different groups of low bit rate users are multiplexed prior to being assembled in ATM minicell.

7. A method as claimed in claim 2, wherein minicells into which said trunk group is assembled are multiplexed with minicell containing other types of traffic prior to being mapped into ATM cells.

8. A method as claim in claim 1, wherein the CI flag and the CP flag comprise separate fields in an ATM service specific conveyance sub-layer (SSCS) control field (SCF).

9. Apparatus for communicating user traffic of a plurality of low bit rate users over an a synchronous transfer (ATM) communications network, comprising:

a multiplexor to multiplex traffic said plurality of low bit rate users to from a trunk group;

an ATM mapper to map said trunk group into ATM minicells; and an assembling said minicells into ATM cells for transmission over the ATM network, wherein said multiplexor is arranged to dynamically vary the trunk group size to accommodate a change in the number of users and said assemble includes means for setting a change indication (CI) flag and a change pulse (CP) flag in a service specific convergence sub-layer (SSCS) control field (SCF) of a minicell in order to indicate an in-band charge in a TDM trunk group size, said CI flag providing a permanent change indication of an in-band change of said trunk group size and said CP flag providing a position of the change in said trunk group size within the minicell.

10. Apparatus for recovering user traffic of a plurality of low bit rate users from received ATM cells comprises:

means for disassembling ATM cells into minicells;

means for recovering a trunk group from said minicells; and a demultiplexer for demultiplxing said trunk group to recover said user traffic of said plurality of low bit rate users, wherein said disassembler includes means for determining an in-band change in a trunk group size from a combination of a change indication (CI) flag and a change pulse (CP) flag in a service specific convergence sub-layer (SSCS) of a received minicell where said CP flag provides a permanent change indication of an in-band change in said trunk group size and said CP flag provides a position of the change in aid trunk group size within the minicell.

* * * * *